(12) United States Patent
Shoji et al.

(10) Patent No.: US 8,840,704 B2
(45) Date of Patent: Sep. 23, 2014

(54) CARBON DIOXIDE SEPARATION METHOD AND APPARATUS

(75) Inventors: Takatoshi Shoji, Kobe (JP); Akira Kimura, Kobe (JP); Teruo Kishimoto, Kakogawa (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 239 days.

(21) Appl. No.: 13/386,219

(22) PCT Filed: Jul. 22, 2010

(86) PCT No.: PCT/JP2010/004691
§ 371 (c)(1),
(2), (4) Date: Mar. 8, 2012

(87) PCT Pub. No.: WO2011/013332
PCT Pub. Date: Feb. 3, 2011

(65) Prior Publication Data
US 2012/0160099 A1    Jun. 28, 2012

(30) Foreign Application Priority Data

Jul. 27, 2009  (JP) ................................. 2009-174513

(51) Int. Cl.
| | | |
|---|---|---|
| B01D 53/04 | (2006.01) | |
| B01J 20/34 | (2006.01) | |
| B01D 53/02 | (2006.01) | |
| B01J 20/32 | (2006.01) | |
| B01D 53/14 | (2006.01) | |

(52) U.S. Cl.
CPC .............. *B01J 20/3248* (2013.01); *Y02C 10/08* (2013.01); *B01D 53/025* (2013.01); *B01D 2259/402* (2013.01); *B01J 20/3466* (2013.01); *B01D 2259/4575* (2013.01); *B01D 2252/2041* (2013.01); *B01J 20/3287* (2013.01); *B01D 2253/25* (2013.01); *B01D 2253/102* (2013.01); *B01J 20/3483* (2013.01); *B01D 2257/504* (2013.01); *B01J 20/3458* (2013.01); *B01D 53/1475* (2013.01); *B01D 2252/20405* (2013.01); *Y02C 10/06* (2013.01); *B01D 2259/4508* (2013.01); *Y02C 10/04* (2013.01)
USPC .................... 95/115; 95/139; 95/148; 96/144; 96/145; 96/153; 423/228; 423/230

(58) Field of Classification Search
USPC .............. 95/114, 115, 139, 148; 96/121, 144, 96/145, 153; 423/228–230
See application file for complete search history.

(56) References Cited

U.S. PATENT DOCUMENTS 2,818,323 A * 12/1957 Haensel ........................ 423/228
3,491,031 A    1/1970 Stoneburner
(Continued)

FOREIGN PATENT DOCUMENTS

JP        49-22375 A *  2/1974
(Continued)

OTHER PUBLICATIONS

European Search Report issued in Application No. 10804085.8; Dated Dec. 21, 2012.
(Continued)

*Primary Examiner* — Frank Lawrence
(74) *Attorney, Agent, or Firm* — Oliff PLC (57) ABSTRACT

A carbon dioxide separation method and a carbon dioxide separation apparatus capable of maintaining a carbon dioxide adsorption capacity for a long term by collecting an amine compound that evaporates during an operation of the apparatus and reloading the amine compound onto a carbon dioxide adsorbent. An amine collector and an amine aqueous solution preparation device are connected to an adsorbent-packed tank packed with a carbon dioxide adsorbent. An amine compound that evaporates from the carbon dioxide adsorbent during an operation of the apparatus is collected by the amine collector into the amine aqueous solution preparation device. The collected amine compound is reloaded onto the carbon dioxide adsorbent via a supply line.

20 Claims, 4 Drawing Sheets

(56) References Cited

U.S. PATENT DOCUMENTS

| | | | |
|---|---|---|---|
| 4,259,301 A | 3/1981 | Say | |
| 4,531,953 A * | 7/1985 | Groose et al. | 95/142 |
| 4,810,266 A * | 3/1989 | Zinnen et al. | 95/139 |
| 8,377,173 B2 * | 2/2013 | Chuang | 95/135 |
| 8,500,854 B1 * | 8/2013 | Pennline et al. | 95/139 |
| 8,500,855 B2 * | 8/2013 | Eisenberger | 95/139 |
| 2006/0096850 A1 | 5/2006 | Kozaki et al. | |
| 2008/0293976 A1 * | 11/2008 | Olah et al. | 568/698 |

FOREIGN PATENT DOCUMENTS

| | | |
|---|---|---|
| JP | U-61-834433 | 6/1986 |
| JP | A-03-502774 | 6/1991 |
| JP | A-04-200742 | 7/1992 |
| JP | A-05-237342 | 9/1993 |
| JP | B2-2635446 | 7/1997 |
| JP | A-2000-502289 | 2/2000 |
| JP | A-2006-130216 | 5/2006 |
| JP | A-2006-275487 | 10/2006 |
| JP | B2-3853398 | 12/2006 |
| JP | A-2009-006275 | 1/2009 |

OTHER PUBLICATIONS

International Search Report issued in Application No. PCT/JP2010/004691; Dated Oct. 26, 2010 (With Tranlsation).

* cited by examiner

CARBON DIOXIDE SEPARATION METHOD AND APPARATUS

TECHNICAL FIELD

The present invention relates to a carbon dioxide separation method and a carbon dioxide separation apparatus, and more particularly to a carbon dioxide separation method and a carbon dioxide separation apparatus configured to separate carbon dioxide from air by repeating carbon dioxide adsorption and desorption alternately with use of a carbon dioxide adsorbent which is, for example, an amino group-containing polymer, or a porous material, with an amine compound loaded on its surface.

BACKGROUND ART

As is well known, there is no means of ventilation in a submarine, spacecraft, or the like. Therefore, a carbon dioxide separation apparatus for keeping a carbon dioxide concentration to a certain level or lower is used in a crew cabin of a submarine or a spacecraft. Meanwhile, in an air-conditioned office or the like, ventilation is necessary. In recent years, the atmospheric carbon dioxide concentration has been increasing. Accordingly, a necessary amount of ventilation for keeping a carbon dioxide concentration in an office to a certain value or less has been increasing every year. In accordance with such an increase in necessary ventilation amount, energy loss in air-conditioning such as cooling or heating has been increasing. In view of this situation, it has been considered to suppress the ventilation amount with use of a carbon dioxide separating air-conditioning system, thereby reducing such energy loss in air conditioning.

Reduction of emission of carbon dioxide known as a greenhouse gas is a global issue. In this respect, development has been conducted on solar energy, wind energy, geothermal energy, etc. At the same time, development and verification tests have been internationally conducted on technology for separating and collecting carbon dioxide contained in a flue gas that is emitted due to use of a fossil fuel such as coal, and storing the collected carbon dioxide under the soil, for example.

Chemical absorption is currently under consideration as one of techniques for large-scale carbon dioxide separation and collection intended for flue gas treatment. The chemical absorption technique is used for separating and collecting carbon dioxide from a flue gas emitted from an ironworks blast furnace or the like. Also, development on a new absorbing liquid has been conducted (see Patent Literature 1). Meanwhile, in the field of carbon dioxide adsorption and separation technology, it is known that development has been conducted on carbon dioxide adsorbents, for example, activated carbon or the like loaded with an amine compound or potassium carbonate (see Patent Literatures 2 and 3).

Among such carbon dioxide adsorbents, a carbon dioxide adsorbent of which the use is being actively pursued is a porous material with an amine compound loaded on its surface, the amine compound acting as a carbon dioxide capturing material. Here, the amine compound serves to adsorb carbon dioxide (see Patent Literatures 3 to 5). Methods disclosed in these conventional arts include a method of loading an amine compound onto alumina, zeolite, a carbon molecular sieve, an ion-exchange resin, a polymer adsorbent, or the like, and a method of regenerating such a carbon dioxide adsorbent through application of heat. Amine compounds have high affinity for carbon dioxide. Therefore, amine compounds easily adsorb low-concentration carbon dioxide present in a living space. In addition, amine compounds that have adsorbed carbon dioxide easily desorb and release the carbon dioxide when subjected to low-temperature heat no higher than 100° C. That is, amine compounds have a feature that their adsorption capacity can be regenerated. Thus, the use of a material loaded with an amine compound makes it possible to only remove carbon dioxide from air in a living space, and to construct a system suitable for purifying air in a living space with a reduced amount of fresh air supply and with reduced energy consumption. There is another conventional art disclosing an air conditioning system where a carbon dioxide adsorbent is regenerated with use of waste heat from an air-conditioning heat source, so that continuous operation of a carbon dioxide separation apparatus is enabled (see Patent Literature 6).

CITATION LIST

Patent Literature

PLT: 1 Japanese Laid-Open Patent Application Publication No. 2009-6275
PLT: 2 Japanese Patent No. 3853398
PLT: 3 Japanese Patent No. 2635446 (Claims)
PLT: 4 Japanese National Phase PCT Laid-Open Publication No. H3-502774 (Claims)
PLT: 5 Japanese National Phase PCT Laid-Open Publication No. 2000-502289 (Claims)
PLT: 6 Japanese Laid-Open Patent Application Publication No. 2006-275487 (Claims)

SUMMARY OF INVENTION

Technical Problem

However, an amine compound used as a carbon dioxide capturing material, such as monoethanolamine or diethanolamine, gradually evaporates. Accordingly, it is known that the carbon dioxide adsorption capacity of an amine compound is reduced when used for a long period of time. In addition, these amines have a problem in terms of thermal stability. It is known that in a combinative desorption reaction between carbon dioxide and an amine (R—NH), an amino group is oxidized when subjected to heat, or carbamic acid (R—NH—COOH) is formed and thereby carbon dioxide is gradually fixed, causing a gradual reduction in the carbon dioxide adsorption capacity. For this reason, replacement of a carbon dioxide adsorbent is necessary every fixed period. This causes a hindrance such as a stop of operation of an apparatus, and also, a cost for the adsorbent replacement needs to be paid frequently. It can be considered that these are part of the reasons why carbon dioxide separation apparatuses that use a material loaded with an amine compound are not widely used although such apparatuses have been well known for a long time.

Solution to Problem

The present invention has been made in order to solve the above-described problems of the conventional arts. An object of the present invention is to provide a carbon dioxide separation method and a carbon dioxide separation apparatus capable of preventing a reduction in the carbon dioxide adsorption capacity of a carbon dioxide adsorbent that uses an amine compound and maintaining the carbon dioxide adsorption capacity for a long period of time without replacement of the adsorbent.

In a carbon dioxide separation apparatus using a carbon dioxide adsorbent where the carbon dioxide adsorbent is a porous material with an amine compound loaded on its surface, it is considered that only a limited part of the amine compound that is present in a thin layer formed on the surface of the carbon dioxide adsorbent reacts with carbon dioxide. Accordingly, it is known that a large part of the amine compound evaporates from the surface of the porous material without reacting with carbon dioxide. In view of this, the present invention also aims at providing a carbon dioxide separation method and a carbon dioxide separation apparatus capable of maintaining the carbon dioxide adsorption capacity for a long period of time without replacement of the adsorbent by collecting the amine compound that is desorbed from the surface of the porous material and reloading the amine compound onto the porous material.

A carbon dioxide separation method according to the present invention uses a carbon dioxide adsorbent which is a porous material loaded with an amine compound. The method includes: adsorbing carbon dioxide by causing a gas, which is to be treated, to come into contact with the carbon dioxide adsorbent; desorbing, from the carbon dioxide adsorbent by using a heated gas stream, carbon dioxide that has been adsorbed to the carbon dioxide adsorbent; and reloading the amine compound onto the porous material of the carbon dioxide adsorbent.

This method makes it possible to compensate for the amine compound that is lost from the surface of the porous material due to evaporation and the amine compound that is lost due to being fixed to the adsorbent as carbamic acid through oxidation. Therefore, a reduction in the carbon dioxide adsorption capacity of the carbon dioxide adsorbent can be avoided. Gases to be treated, such as air in a living space and an exhaust gas, contain carbon dioxide and also contain volatile organic compounds (VOC) and small amounts of, for example, $SO_x$ and $NO_x$. If these are adhered to the surface of the adsorbent, the carbon dioxide adsorption capacity of the adsorbent is reduced. According to the present invention, such a reduced carbon dioxide adsorption capacity can be recovered by reloading the amine compound onto the porous material. The reloading of the amine compound onto the porous material may be performed at a suitable timing between the adsorbing step and the desorbing step, which are repeatedly performed.

The above method may further include collecting the amine compound that has been desorbed from the carbon dioxide adsorbent. The amine compound used in the amine reloading step may include the amine compound that has been collected in the amine collecting step.

Since the collected amine compound is reloaded onto the porous material, wasting of the amine compound is reduced, and a reduction in the carbon dioxide adsorption capacity of the adsorbent can be avoided.

The amine collecting step may include collecting the amine compound from the gas stream that has desorbed carbon dioxide from the carbon dioxide adsorbent in the desorbing step. In particular, in the case of using heated air as the gas stream in the desorbing step, the amine compound partially evaporates when carbon dioxide is desorbed. Accordingly, if amine capturing is performed in the carbon dioxide desorbing step, the evaporated amine compound can be almost entirely collected.

The above method may further include cooling, by using a gas stream, the carbon dioxide adsorbent that has been heated by the heated gas stream in the desorbing step. The amine collecting step may include collecting the amine compound from the gas stream that has cooled the carbon dioxide adsorbent in the cooling step. In particular, the carbon dioxide adsorbent is not sufficiently cooled down at an early stage of the cooling step. Accordingly, the amine compound partially evaporates during a period until the temperature of the carbon dioxide adsorbent is reduced to an ordinary temperature. By collecting the evaporated amine compound and reloading the amine compound onto the porous material, wasting of the amine compound is reduced, and a reduction in the carbon dioxide adsorption capacity of the adsorbent can be avoided.

In the above method, another same carbon dioxide adsorbent may be used. In this case, the method further includes: cooling, by using a gas stream, the carbon dioxide adsorbent that has been heated by the heated gas stream in the desorbing step; and introducing the gas stream that has cooled the carbon dioxide adsorbent to the other carbon dioxide adsorbent, and capturing, with the other carbon dioxide adsorbent, the amine compound that is contained in the gas stream.

In the carbon dioxide separation method using at least two absorbent-packed tanks with carbon dioxide adsorbents, it is often the case where one of the carbon dioxide adsorbents is used for carbon dioxide adsorption while the other carbon dioxide adsorbent is in a standby state. A heated gas stream for use in carbon dioxide desorption is supplied to the carbon dioxide adsorbent that has adsorbed carbon dioxide. In particular, in the case of using steam as the heated gas stream for use in carbon dioxide desorption, the steam is first condensed at an end portion of the carbon dioxide adsorbent, and thereby the temperature of the end portion is increased. The position of such a temperature-increased portion is sequentially moved. Accordingly, carbon dioxide is sequentially desorbed from respective temperature-increased portions. The carbon dioxide desorption is completed within a relatively short period of time. Thereafter, a cooling gas stream is supplied to the carbon dioxide adsorbent for which the carbon dioxide desorption has been completed. At the time, the gas stream that comes out of the carbon dioxide adsorbent contains the amine compound that has evaporated. By introducing the gas stream to the other carbon dioxide adsorbent, the evaporated amine compound can be captured with the other carbon dioxide adsorbent. In this manner, the evaporated amine compound can be collected on the other carbon dioxide adsorbent, without requiring a particular step of collecting the amine compound.

In the above carbon dioxide separation method, mono ethanolamine, diethanolamine, or a mixture of monoethanolamine and diethanolamine may be used as the amine compound. The reason for this is as follows: these amine compounds have high affinity for carbon dioxide and easily adsorb carbon dioxide at ordinary temperatures; carbon dioxide adsorbed to these amine compounds can be easily desorbed from them through application of heat of a relatively low temperature in the range of 40° C. to 70° C.; and when any of these amine compounds is used, the amine compound is not thermally degraded and the amount of its evaporation when subjected to heat is small. When cooling down these amine compounds for collecting them, it is not necessary to use a chilling unit that comsumes high power, but simple cooling means such as an air cooler is sufficient to condense these amine compounds. When these amine compounds evaporate, pore space on the surface of the porous material expands. Accordingly, amine compound reloading can be easily performed, and also, a reduction in the specific surface area of the adsorbent due to excessive amine compound loading can be avoided. Therefore, the carbon dioxide adsorption capacity of a carbon dioxide adsorbent using any of these amine compounds can be almost recovered to its initial capacity through amine compound reloading. Monoethanolamine and diethanolamine are volatile as is clear from the fact that they are used for a volatile corrosion inhibitor or the like. As described above, monoethanolamine and diethanolamine gradually evaporate when subjected to heat, and are desorbed from the surface of the porous material. However, in the above-described invention, the evaporated amine compound can be collected in the amine collecting step. Therefore, a problem of reduction in the carbon dioxide adsorption capacity due to amine compound evaporation does not occur.

In the above carbon dioxide separation method, a mixture gas of air and steam may be used as the heated gas stream. Since a mixture gas of air and steam is used, a large amount of heat of the steam can be condensed and used in carbon dioxide desorption. Accordingly, the flow rate of air supplied for carbon dioxide desorption can be reduced. As a result, an amine evaporation rate which is proportional to the air flow rate can be suppressed. In a case where the amine evaporation rate is high, it is necessary to frequently perform amine reloading. In this case, however, a mixture gas of air and steam may be used to reduce the air flow rate, and thereby reduce the amine reloading frequency. This improves stability of the carbon dioxide separation method. Moreover, through the reduction of the air flow rate, loss of heat exhausted to the outside due to the gas stream can be reduced.

A carbon dioxide separation apparatus according to the present invention uses a carbon dioxide adsorbent which is a porous material loaded with an amine compound. The apparatus includes: an adsorbent-packed tank packed with the carbon dioxide adsorbent; an air supplier configured to supply a gas to be treated, the gas containing carbon dioxide, to the adsorbent-packed tank; a heated gas stream supplier configured to supply a heated gas stream for use in desorbing, from the carbon dioxide adsorbent, carbon dioxide that has been adsorbed to the carbon dioxide adsorbent; and an amine re-loading device configured to supply the amine compound to the porous material of the carbon dioxide adsorbent to reload the amine compound onto the carbon dioxide adsorbent.

According to this configuration, the amine compound that is lost from the carbon dioxide adsorbent due to, for example, evaporation or oxidation can be compensated for. Accordingly, a reduction in the carbon dioxide adsorption capacity of the carbon dioxide adsorbent can be avoided. Even if the carbon dioxide adsorption capacity is reduced due to, for example, volatile organic compounds, $SO_x$, and $NO_x$, the reduced carbon dioxide adsorption capacity can be recovered. Reloading of the amine compound onto the porous material may be performed while the apparatus is stopped or at a suitable timing between carbon dioxide adsorption and carbon dioxide desorption, which are repeatedly performed.

The above apparatus may further include an amine collector configured to collect the amine compound that has been desorbed from the carbon dioxide adsorbent. The amine compound used in the reloading by the amine re-loading device may include the amine compound that has been collected by the amine collector.

Since the collected amine compound is reloaded onto the porous material, wasting of the amine compound is reduced, and a reduction in the carbon dioxide adsorption capacity of the adsorbent can be avoided.

The amine collector may be configured to collect the amine compound from the gas stream that has desorbed carbon dioxide from the carbon dioxide adsorbent. In particular, in the case of using heated air as the gas stream for carbon dioxide desorption from the carbon dioxide adsorbent, the amine compound partially evaporates when carbon dioxide is desorbed. Accordingly, if amine capturing from the gas stream that has desorbed the carbon dioxide from the carbon dioxide adsorbent is performed, the evaporated amine compound can be almost entirely collected.

The above apparatus may further include a cooling gas stream supplier configured to supply a cooling gas stream to the carbon dioxide adsorbent from which carbon dioxide has been desorbed. The amine collector may be configured to collect the amine compound from the gas stream that has cooled the carbon dioxide adsorbent. In particular, the carbon dioxide adsorbent is not sufficiently cooled down at an early stage after the start of the supply of the cooling gas stream. Accordingly, the amine compound partially evaporates during a period until the temperature of the carbon dioxide adsorbent is reduced to an ordinary temperature. By collecting the evaporated amine compound and reloading the amine compound onto the porous material, wasting of the amine compound is reduced, and a reduction in the carbon dioxide adsorption capacity of the adsorbent can be avoided.

The above apparatus may further include another same adsorbent-packed tank. In this case, the apparatus further includes a cooling gas stream supplier configured to supply a cooling gas stream to the carbon dioxide adsorbent from which carbon dioxide has been desorbed; and an amine collector configured to introduce the gas stream that has cooled the carbon dioxide adsorbent to the other adsorbent-packed tank, and to capture, with a carbon dioxide adsorbent in the other adsorbent-packed tank, the amine compound that is contained in the gas stream.

In the carbon dioxide separation apparatus including at least two adsorbent-packed tanks, it is often the case where one of the adsorbent-packed tanks is used for carbon dioxide adsorption while the other adsorbent-packed tank is in a standby state. A heated gas stream for use in carbon dioxide desorption is supplied from the heated gas stream supplier to the adsorbent-packed tank that has adsorbed carbon dioxide. In particular, in the case of using steam as the heated gas stream for use in carbon dioxide desorption, the steam is first condensed at an end portion of the carbon dioxide adsorbent, and thereby the temperature of the end portion is increased. The position of such a temperature-increased portion is sequentially moved. Accordingly, carbon dioxide is sequentially desorbed from respective temperature-increased portions. The carbon dioxide desorption is completed within a relatively short period of time. Thereafter, a cooling gas stream is supplied from the cooling gas stream supplier to the adsorbent-packed tank for which the carbon dioxide desorption has been completed. At the time, the gas stream that comes out of the adsorbent-packed tank contains the amine compound that has evaporated. By introducing the gas stream to the other adsorbent-packed tank, the amine compound contained in the gas stream can be captured with the carbon dioxide adsorbent in the other adsorbent-packed tank. In this manner, the evaporated amine compound can be collected on the carbon dioxide adsorbent in the other adsorbent-packed tank, without requiring a particular step of collecting the amine compound.

In the carbon dioxide separation apparatus according to the present invention, it is preferred to use monoethanolamine, diethanolamine, or a mixture of monoethanolamine and diethanolamine as the amine compound.

In the above carbon dioxide separation apparatus, a mixture gas of air and steam may be used as the heated gas stream. Since a mixture gas of air and steam is used, a large amount of heat of the steam can be condensed and used in carbon dioxide desorption. Accordingly, the flow rate of air supplied for carbon dioxide desorption can be reduced. As a result, an amine evaporation rate which is proportional to the air flow rate can be suppressed. In a case where the amine evaporation rate is high, it is necessary to frequently perform amine reloading. In this case, however, the air flow rate can be reduced by using a mixture gas of air and steam, and accordingly, the amine reloading frequency can be reduced. This improves stability of the carbon dioxide separation apparatus. Moreover, through the reduction of the air flow rate, loss of heat exhausted to the outside due to the gas stream can be reduced.

A carbon dioxide separation method according to another aspect of the present invention uses a carbon dioxide adsorbent containing an amino group. The method includes: adsorbing carbon dioxide by causing a gas, which is to be treated, to come into contact with the carbon dioxide adsorbent; and desorbing, from the carbon dioxide adsorbent by using a heated gas stream containing air and steam, carbon dioxide that has been adsorbed to the carbon dioxide adsorbent.

A carbon dioxide separation apparatus according to another further aspect of the present invention uses a carbon dioxide adsorbent containing an amino group. The apparatus includes: an adsorbent-packed tank packed with the carbon dioxide adsorbent; an air supplier configured to supply a gas to be treated, the gas containing carbon dioxide, to the adsorbent-packed tank; and a heated gas stream supplier configured to supply a heated gas stream for use in desorbing, from the carbon dioxide adsorbent, carbon dioxide that has been adsorbed to the carbon dioxide adsorbent. The heated gas stream is a mixture gas containing air and steam.

Examples of the carbon dioxide adsorbent containing an amino group herein include a polymer containing an amino group and an ion-exchange resin, in addition to the above-described carbon dioxide adsorbent which is the porous material loaded with the amine compound.

As described above, by using a mixture gas of air and steam as a heated gas stream for desorbing carbon dioxide from a carbon dioxide adsorbent, an amine evaporation rate can be suppressed and a large portion of heat of the heated gas stream can be used for the carbon dioxide desorption.

Advantageous Effects of Invention

According to the carbon dioxide separation method and the carbon dioxide separation apparatus of the present invention, even if carbon dioxide adsorption and desorption are repeated alternately, a reduction in the carbon dioxide adsorption capacity of the carbon dioxide adsorbent is prevented by reloading the amine compound onto the surface of the porous material, and the carbon dioxide adsorption capacity can be maintained for a long period of time without replacement of the carbon dioxide adsorbent.

By performing the amine collecting step, the amine compound that has evaporated can be captured and collected. This makes it possible to reduce a consumption amount of the amine compound necessary for the reloading onto the carbon dioxide adsorbent.

Monoethanolamine, diethanolamine, or a mixture of monoethanolamine and diethanolamine is used as the amine compound. Accordingly, the amine compound can be collected at a relatively low temperature, and also, the amine compound that has evaporated can be collected without causing thermal degradation.

In the configuration where a mixture gas of air and steam is used as a heated gas stream, the flow rate of air supplied for carbon dioxide desorption can be reduced. As a result, an amine evaporation rate which is proportional to the air flow rate can be suppressed. In addition, a large portion of heat of the heated gas stream can be used for carbon dioxide desorption. Accordingly, heat loss can be suppressed.

Even if the carbon dioxide adsorption capacity is reduced due to, for example, degradation of the carbon dioxide adsorbent caused by sulfur dioxide contained in a gas to be treated, the carbon dioxide adsorption capacity can be recovered to the initial capacity by reloading the carbon dioxide adsorbent with the amine compound. In a carbon dioxide separation apparatus using an adsorbent, replacement of a solid adsorbent is problematic since it affects the operation period of the apparatus and is unfavorable in terms of economic efficiency. However, according to the present invention, the carbon dioxide adsorption capacity can be easily recovered through the amine compound reloading without requiring the replacement of the adsorbent.

DESCRIPTION OF EMBODIMENTS

Hereinafter, embodiments of the present invention are described with reference to the drawings. It should be noted that the present invention is not limited by the description below.

In the present invention, examples of a porous material used for a carbon dioxide adsorbent include activated carbon and activated alumina. These porous materials have a large number of pores on their surface, and are capable of supporting a large amount of amine compound. Such a porous material support loaded with an amine compound is suitable for adsorbing carbon dioxide. Among these porous materials, activated carbon is suitable for a light-weight carbon dioxide adsorbent since the bulk density of activated carbon is small. Activated carbon is suitable for an adsorbent also for another reason that activated carbon is capable of deodorizing slight ammonia odor of an amine compound. Preferably, activated carbon suitable for a carbon dioxide adsorbent has an average pore diameter of 20 to 100 Å, a pore volume of 1.0 to 2.0 cc/g, and a specific surface area of 1000 to 2000 $m^2/g$.

In the present invention, examples of an amine compound used for a carbon dioxide adsorbent include polyethyleneimine, monoethanolamine, diethanolamine, triethanolamine, tetraethylenepentamine, methyldiethanolamine, isopropanolamine, diisopropanolamine, dibutylamine, diethylenetriamine, triethylenetetramine, hexamethylenediamine, benzylamine, and morpholine. Among these, monoethanolamine and diethanolamine are particularly suitable for the reason that carbon dioxide adsorbed thereon can be desorbed through application of relatively low temperature heat, and that these amine compounds can be easily collected even when they are evaporated. A mixture of these compounds is also suitable.

In the present invention, a porous material loaded with an amine compound can be obtained in the following manner: for example, in the case of diethanolamine, activated carbon is added into an aqueous solution of diethanolamine, the concentration of which is adjusted within the range of 10 to 55%, and the resultant aqueous solution is filtered and dried. Usually, a carbon dioxide adsorbent with an amine loading of 20 to 200 wt % is obtained.

Figure 1:
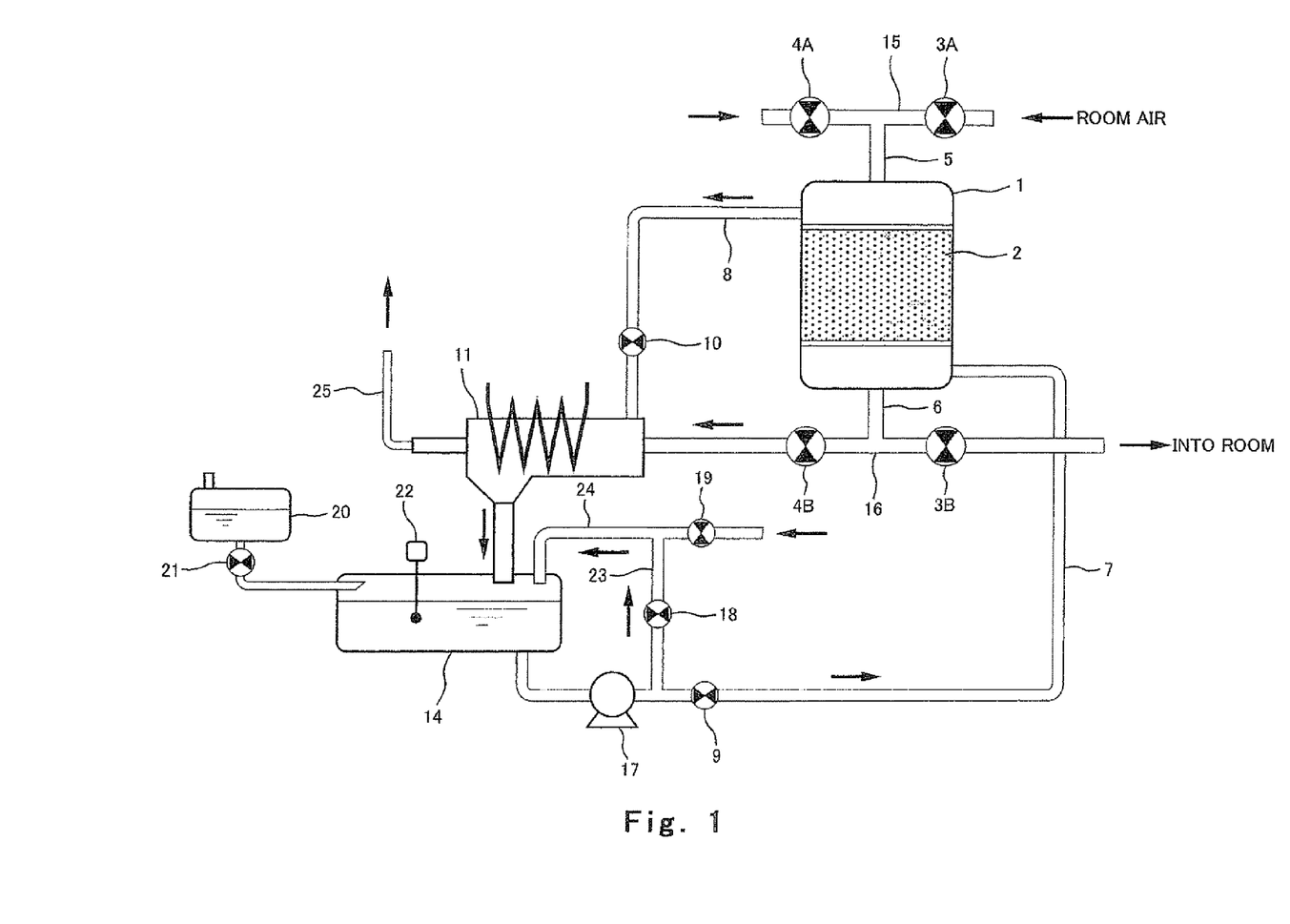
FIG. 1 is a schematic configuration diagram showing a carbon dioxide separation apparatus according to an embodiment of the present invention.

FIG. 1 shows a schematic structure of a carbon dioxide separation apparatus according to an embodiment of the present invention. Description is given below with reference to FIG. 1 on the assumption that the carbon dioxide separation apparatus according to the present embodiment is used for separating carbon dioxide from room air. The carbon dioxide separation apparatus according to the present embodiment includes an adsorbent-packed tank 1, which is packed with a carbon dioxide adsorbent 2. The adsorbent-packed tank 1 is connected to an air supply line 15 via an input line 5. The air supply line 15 is provided with valves 3A and 4A. The adsorbent-packed tank 1 is also connected to a return line 16 via an output line 6. The return line 16 is provided with valves 3B and 4B. A supply line 7 for supplying an amine aqueous solution is connected to a lower part of the adsorbent-packed tank 1, and a discharge line 8 for discharging the amine aqueous solution is connected to an upper part of the adsorbent-packed tank 1. The discharge line 8 is connected to an amine collector 11 via a valve 10. The aforementioned return line 16 is also connected to the amine collector 11.

The amine collector 11 is a condenser configured to perform a cooling operation by means of cooling water or cooling air. An air discharge line 25, through which a gas stream is discharged from the amine collector 11 after amine collection, is connected to the amine collector 11. An amine aqueous solution preparation device 14 for storing an aqueous solution of an amine compound to be loaded onto the carbon dioxide adsorbent 2, is provided below the amine collector 11. The amine aqueous solution preparation device 14 includes a sensor 22 configured to detect the amine concentration, temperature, and liquid level of the amine aqueous solution. The amine concentration of the amine aqueous solution is adjusted by using an undiluted amine solution supplied from an undiluted amine solution tank 20. The aforementioned supply line 7 is connected to the amine aqueous solution preparation device 14. The supply line 7 is provided with a valve 9 and a solution feed pump 17. Circulation lines 23 and 24 are provided between the solution feed pump 17 and the valve 9. The circulation line 23 is provided with a valve 18. The circulation line 24 is provided with a valve 19 configured to supply dilution water for use in adjusting the amine concentration of the amine aqueous solution.

The carbon dioxide separation apparatus according to the present embodiment is used in a manner as described below. First, the valves 3A and 3B are opened and the valves 4A, 48, and 10 are closed. In this state, room air to be treated is supplied to the adsorbent-packed tank 1 through the air supply line 15 and the input line 5. After the carbon dioxide of the air has been adsorbed by the carbon dioxide adsorbent 2 within the adsorbent-packed tank 1, the air is returned into the room through the output line 6 and the return line 16.

Next, at the time of desorbing the carbon dioxide from the carbon dioxide adsorbent 2 to regenerate the carbon dioxide adsorbent 2, the valves 4A and 4B are opened and the valves 3A, 3B, and 10 are closed. In this state, heated air of 40 to 70° C. is supplied as a heated gas stream to the carbon dioxide adsorbent 2 through the valve 4A, the air supply line 15, and the input line 5. The heated air increases the temperature of the carbon dioxide adsorbent 2. As a result, the carbon dioxide adsorbed to the carbon dioxide adsorbent 2 is desorbed and then discharged to the outdoor air together with the heated air through the output line 6, the valve 4B, the return line 16, the amine collector 11, and the air discharge line 25. Here, the amine compound that evaporates and flows with the gas stream is cooled down and condensed when passing through the amine collector 11. The condensed amine compound is then stored in the amine aqueous solution preparation device 14.

Immediately after the carbon dioxide desorption is completed, the temperature of the carbon dioxide adsorbent 2 is 40 to 70° C., which is substantially the same as the temperature of the heated gas stream used in the carbon dioxide desorption. In order to cool down the carbon dioxide adsorbent 2, a cooling gas stream is sent to the carbon dioxide adsorbent 2 instead of the heated air for use in carbon dioxide desorption. At the time of supplying the cooling gas stream, the room air that flows through the air supply line 15 and the input line 5 may be used as the cooling gas stream. In this case, the valve 4A is closed and the valve 3A is opened. The gas stream is, after having cooling down the carbon dioxide adsorbent 2, discharged to the outdoor air through the output line 6, the valve 413, the return line 16, the amine collector 11, and the air discharge line 25. Here, the amine compound that evaporates and flows with the gas stream is cooled down and condensed when passing through the amine collector 11. The condensed amine compound is then stored in the amine aqueous solution preparation device 14.

After the temperature of the carbon dioxide adsorbent 2 is reduced, the valves 4A, 4B, and 10 are closed and the valves 3A and 313 are opened. Accordingly, the room air is supplied to the carbon dioxide adsorbent 2 and carbon dioxide adsorption is started again.

The amine aqueous solution preparation device 14, which collects the evaporated amine compound, stores an aqueous solution of a predetermined concentration and amount of amine to be loaded onto the carbon dioxide adsorbent 2. The amine aqueous solution is agitated by operating the solution feed pump 17 intermittently or at regular intervals, with the valves 9 and 19 closed and the valve 18 opened.

Reloading of the amine compound onto the carbon dioxide adsorbent 2 is performed by operating the solution feed pump 17 with the valves 9 and 10 opened and the valves 3A, 3B, 4A, 413, and 18 closed. The amine aqueous solution for the reloading is supplied to the adsorbent-packed tank 1 through the line 7. As a result, the amine aqueous solution is impregnated into the carbon dioxide adsorbent 2. The discharge line 8 is connected to the upper part of the adsorbent-packed tank 1 at a higher elevation than the top of the adsorbent 2. This allows the adsorbent 2 to be entirely immersed in the amine aqueous solution supplied from the adsorbent-packed tank 1. The amine aqueous solution that flows out of the tank 1 into the line 8 is returned to the amine aqueous solution preparation device 14 through the amine collector 11. Since the amine aqueous solution passes through the amine collector 11, the condensed amine that remains within the amine collector 11 is efficiently collected into the amine aqueous solution preparation device 14. In this manner, reloading of the amine compound onto the adsorbent 2 by means of the amine aqueous solution is performed for a certain period of time. Thereafter, the solution feed pump 17 is stopped and the amine aqueous solution within the adsorbent-packed tank 1 is returned to the amine aqueous solution preparation device 14 through the line 7. Subsequently, with the valves 4A and 4B opened and the valves 3A, 313, 9, and 10 closed, heated air is supplied to the adsorbent-packed tank 1 through the valve 4A. Accordingly, the carbon dioxide adsorbent 2 is dried, and thereby the reloading of the amine compound onto the carbon dioxide adsorbent 2 is completed.

In the configuration shown in FIG. 1, the amount of amine aqueous solution stored in the amine aqueous solution preparation device 14 is set to be slightly greater than the volume of the adsorbent-packed tank 1. For example, if the capacity of the adsorbent-packed tank 1 is 100 L, it is preferred that the amount of amine aqueous solution stored in the amine aqueous solution preparation device 14 is approximately 120 L. The reason for this is that if the amine aqueous solution stored in the amine aqueous solution preparation device 14 is emptied while the amine aqueous solution is circulated for reloading of the amine compound, then the circulation of the amine aqueous solution is stagnated. However, in a case where multiple adsorbent-packed tanks form the adsorbent-packed tank 1 in a manner similar to a general gas adsorption system, the reloading can be sequentially performed for each adsorbent-packed tank. Therefore, in this case, the amine aqueous solution needs to be stored in an amount that merely corresponds to the capacity of one adsorbent-packed tank. For example, assume a case where four adsorbent-packed tanks form the adsorbent-packed tank 1 having a capacity of 100 L. In this case, each of the four tanks has a capacity of 25 L. Accordingly, storing the amine aqueous solution of approximately 30 L, that is, ¼ of approximately 120 L, will suffice.

Table 1 shows a fabrication example of the carbon dioxide adsorbent used in the carbon dioxide separation apparatus shown in FIG. 1. A porous material that was used in fabricating the carbon dioxide adsorbent was granular activated carbon. Diethanolamine was used as an amine compound to be loaded onto the activated carbon. In the fabrication of the carbon dioxide adsorbent, the activated carbon was immersed in an aqueous solution of 40% diethanolamine for 24 hours, and thereby diethanolamine was impregnated into the activated carbon. Thereafter, a surplus portion of the amine aqueous solution was separated from the activated carbon, and then the activated carbon was dried.

TABLE 1

Carbon Dioxide Adsorbent

| Porous Material | Amine Compound to be Loaded | Loading Rate*[2] | Adsorption Rate*[3] |
|---|---|---|---|
| Activated Carbon*[1] | Diethanolamine | 150 | 2.4 |

*[1]Activated Carbon: Average pore diameter of 30 Å, Specific surface area of 1800 $m^2/g$
*[2]Loading Rate: Diethanolamine's weight with a score of 100 representing activated carbon's weight
*[3]Adsorption Rate: Adsorbed carbon dioxide amount with a score of 100 representing the amount of a dry adsorbent In relation to the carbon dioxide adsorbent of Table 1, Table 2 shows a carbon dioxide adsorption capacity and an amine loading rate that were continued after a test in which carbon dioxide adsorption-desorption cycles were repeated by using the carbon dioxide separation apparatus of FIG. 1 for room air of 0.1% carbon dioxide concentration. In this test, carbon dioxide adsorption was performed for 30 minutes and carbon dioxide desorption was performed for 30 minutes (a total of 1 hour) in each cycle. This cycle was repeated 170 times (i.e., 170 hours). It is clear from Table 2 that after the carbon dioxide adsorption and desorption were repeated 170 cycles with the apparatus of FIG. 1, the diethanolamine loading rate was reduced to 90 wt % and the carbon dioxide adsorption capacity was reduced to approximately ⅓ (35%) of the initial adsorption capacity. However, Table 2 shows that as a result of diethanolamine reloading, the loading rate and the adsorption capacity were recovered to the values substantially close to the values obtained immediately after the fabrication.

TABLE 2

Comparison Regarding Carbon Dioxide Adsorbent

| Test Timing | Immediately After Fabrication | After 170 hours of Operation | After Reloading |
|---|---|---|---|
| Loading Rate*[1] | 150 | 90 | 143 |
| Adsorption Rate*[2] | 2.4 | 0.84 | 2.3 |

*[1]Loading Rate: Diethanolamine's weight with a score of 100 representing activated carbon's weight
*[2]Adsorption Rate: Adsorbed $CO_2$ amount with a score of 100 representing the amount of a dry adsorbent Here, assume an example case where during a one-week period, the carbon dioxide separation apparatus is operated in an air-conditioned office for approximately 50 hours and amine compound reloading is performed on a nonworking day. In this case, since Table 2 shows that the carbon dioxide adsorption capacity after 170 hours of the apparatus operation is 35% of the initial capacity, the carbon dioxide adsorption capacity after 50 hours of the apparatus operation is approximately 80% of the initial capacity according to simple proportional calculation. This value is reasonable as a design safety factor for an actual carbon dioxide separation apparatus.

Figure 2:
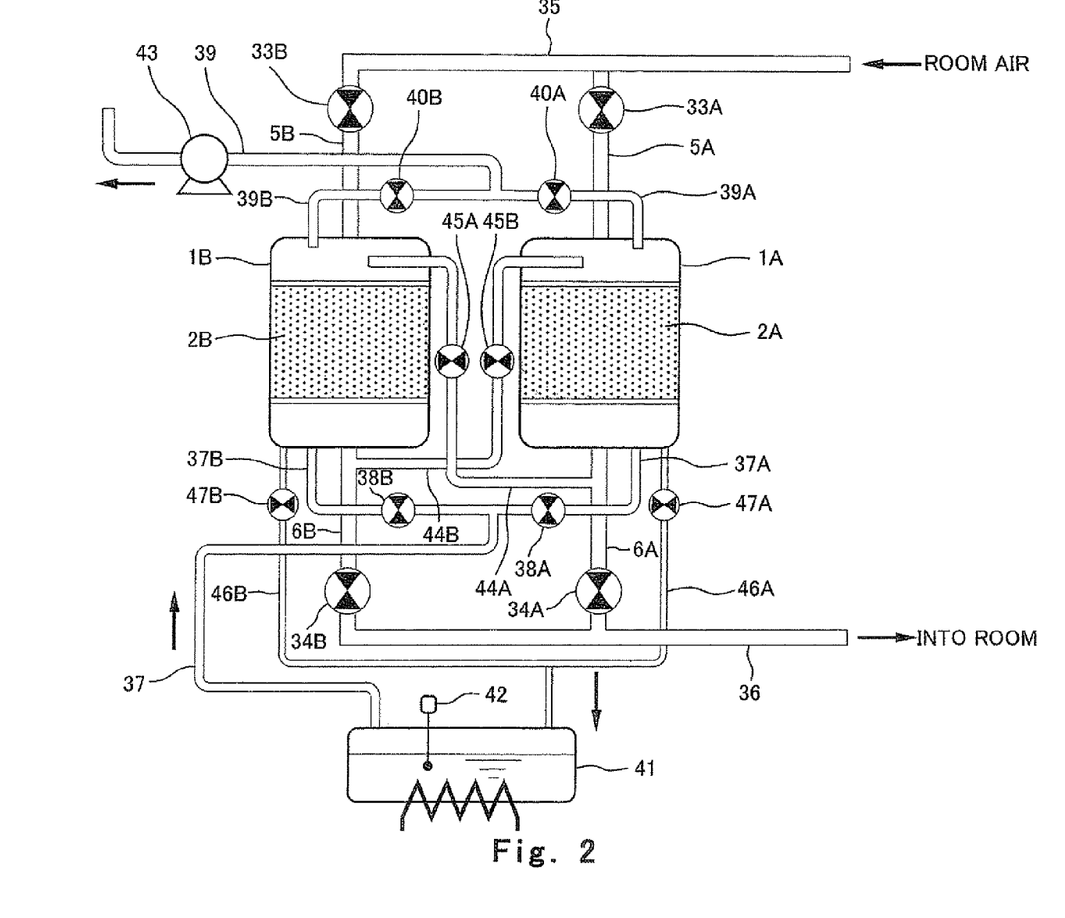
FIG. 2 is a schematic configuration diagram showing a carbon dioxide separation apparatus including two adsorbent-packed tanks according to another embodiment of the present invention.
Figure 4:
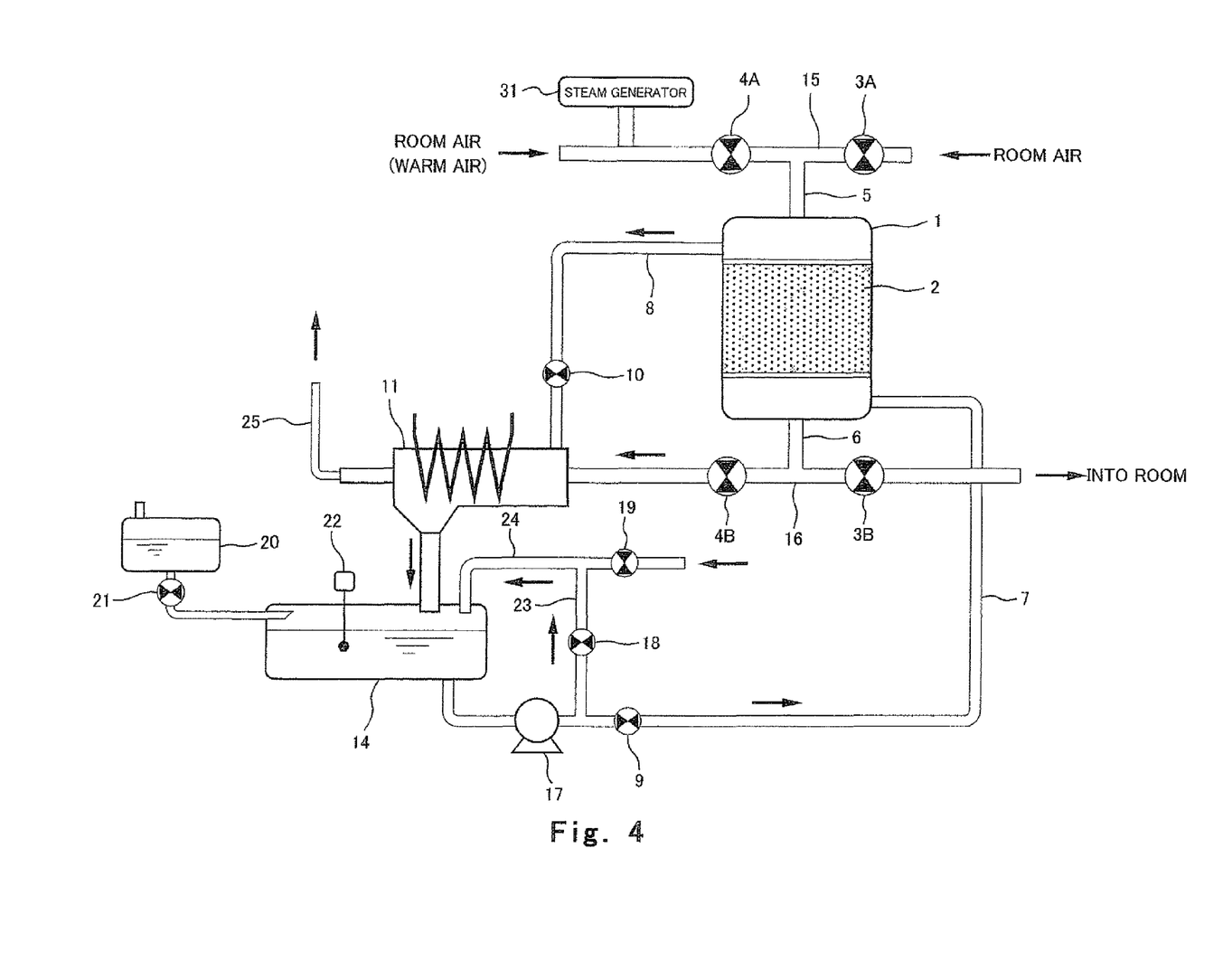
FIG. 4 shows a schematic configuration of a carbon dioxide separation apparatus that uses steam or a mixture gas of air and steam as a heated gas stream for carbon dioxide desorption.

The carbon dioxide separation apparatus according to the present invention is usable not only for carbon dioxide separation from air that contains a relatively low concentration of carbon dioxide, for example, air in a living space such as an air-conditioned office space, but also for carbon dioxide separation from air that contains a high concentration of carbon dioxide such as a flue gas from a coal fired power plant or the like. Table 3 shows a carbon dioxide separation performance test example, in which a carbon dioxide separation apparatus as shown in FIG. 1, FIG. 2, or FIG. 4, and air to be treated that contains a low concentration of carbon dioxide, were used. Table 4 shows a carbon dioxide separation performance test example, in which a carbon dioxide separation apparatus as shown in FIG. 1, FIG. 2, or FIG. 4, and air to be treated that contains a high concentration of carbon dioxide, were used. In the test of "Low-Concentration $CO_2$ Adsorption" in Table 3, air of 0.1 to 2.0% carbon dioxide concentration was used, intended as air of a living space in, for example, a submarine or an office. In the test of "High-Concentration $CO_2$ Adsorption" in Table 4, air of 10 to 30% carbon dioxide concentration was used, intended as a flue gas from a coal fired power plant or the like. It is clear from these tables that the present invention exerts advantageous effects when applied to a carbon dioxide separation method and/or a carbon dioxide separation apparatus that are intended for separating low-concentration carbon dioxide from room air and high-concentration carbon dioxide from a flue gas.

TABLE 3

CO₂ Adsorption Data Example 1 (Low-Concentration CO₂ Adsorption)

| | Air at Inlet of Adsorption Cylinder | | | Air at Outlet | CO₂ Desorption Conditions | | Adsorption Capacity | | CO₂ Separation Apparatus |
|---|---|---|---|---|---|---|---|---|---|
| | Temp. | Humidity | CO₂ Conc. | CO₂ Conc. | Heated gas stream | Temp | Adsorbent Amount | CO₂ Adsorption Amount | |
| Test 1 | 20° C. | 5 RH % or lower | 0.10% | 0.007% | Warm Air | 65° C. | 2.9 kg | 1.1 wt % | FIG. 1 |
| Test 2 | 20° C. | 5 RH % or lower | 0.20% | 0.007% | Warm Air | 65° C. | 2.9 kg | 2.2 wt % | FIG. 1 |
| Test 3 | 20° C. | 5 RH % or lower | 0.50% | 0.060% | Warm Air | 65° C. | 2.9 kg | 4.9 wt % | FIG. 1 |
| Test 4 | 24° C. | 50 RH % | 0.10% | 0.005% | Warm Air | 65° C. | 2.0 kg | 2.0 wt % | FIG. 1 |
| Test 5 | 26° C. | 50 RH % | 0.10% | 0.017% | Warm Air | 65° C. | 2.0 kg | 2.0 wt % | FIG. 1 |
| Test 6 | 28° C. | 50 RH % | 0.10% | 0.037% | Warm Air | 65° C. | 2.0 kg | 1.7 wt % | FIG. 1 |
| Test 7 | 22° C. | 5 RH % or lower | 0.10% | 0.032% | Saturated Steam | 45° C. | 2.0 kg | 2.8 wt % | FIG. 2 |
| Test 8 | 22° C. | 5 RH % or lower | 0.10% | 0.023% | Saturated Steam | 55° C. | 2.0 kg | 3.5 wt % | FIG. 2 |
| Test 9 | 22° C. | 5 RH % or lower | 0.10% | 0.020% | Saturated Steam | 65° C. | 2.0 kg | 3.8 wt % | FIG. 2 |
| Test 10 | 20° C. | 5 RH % or lower | 0.13% | 0.007% | Mixture of Warm Air and Steam | 68° C. | 2.5 kg | 3.0 wt % | FIG. 4 |

TABLE 4

CO₂ Adsorption Data Example 2 (High-Concentration CO₂ Adsorption)

| | Air at Inlet of Adsorption Cylinder | | | Air at Outlet | CO₂ Desorption Conditions | | Adsorption Capacity | | CO₂ Separation Apparatus |
|---|---|---|---|---|---|---|---|---|---|
| | Temp. | Humidity | CO₂ Conc. | CO₂ Conc. | Heated gas stream | Temp | Adsorbent Amount | CO₂ Adsorption Amount | |
| Test 11 | 20° C. | 5 RH % or lower | 5.0% | 0.20% | Saturated Steam | 47° C. | 2.0 kg | 6.0 wt % | FIG. 2 |
| Test 12 | 35° C. | 5 RH % or lower | 10.0% | 0.09% | Saturated Steam | 48° C. | 2.0 kg | 6.1 wt % | FIG. 2 |
| Test 13 | 40° C. | 20 RH % | 10.6% | 0.10% | Saturated Steam | 60° C. | 2.0 kg | 7.4 wt % | FIG. 2 |
| Test 14 | 40° C. | 50 RH % | 10.2% | 0.10% | Saturated Steam | 60° C. | 2.0 kg | 7.2 wt % | FIG. 2 |
| Test 15 | 40° C. | 70 RH % | 11.0% | 0.10% | Saturated Steam | 60° C. | 2.0 kg | 6.9 wt % | FIG. 2 |
| Test 16 | 20° C. | 5 RH % or lower | 10.0% | 0.1% or lower | Mixture of Warm Air and Steam | 68° C. | 2.5 kg | 6.4 wt % | FIG. 4 |

In the carbon dioxide separation apparatus according to the present invention, a carbon dioxide adsorbent loaded with an amine compound is used. Accordingly, it can be considered that sulfur dioxide contained in a flue gas from a coal fired power plant or the like reacts with the amine compound, causing a reduction in the carbon dioxide adsorption capacity. Table 5 shows results of a test, in which influence of sulfur dioxide contained in a flue gas from a coal fired power plant or the like was tested by using an apparatus according to an embodiment shown in FIG. 2. The apparatus will be described below. The carbon dioxide adsorbent of Table 1 was used in the test, in which air of 20° C. that contains approximately 10% of carbon dioxide was supplied to the adsorbent, and a carbon dioxide adsorption amount was measured. Other than this test, a carbon dioxide adsorption test was conducted in the same manner by using the carbon dioxide adsorbent of Table 1 after air containing approximately 2000 ppm of sulfur dioxide was supplied to the adsorbent. As shown in Table 5, the adsorbent exposed to the sulfur dioxide indicated a significant reduction in the carbon dioxide adsorption capacity, as compared to the adsorbent that was not exposed to the sulfur dioxide. Here, the adsorbent, the carbon dioxide adsorption capacity of which was reduced, was reloaded with diethanolamine. As a result, it was confirmed that the adsorbent reloaded with diethanolamine indicated substantially the same carbon dioxide adsorption capacity as that of the adsorbent that was not supplied with the sulfur dioxide. It should be noted that, in reality, a flue gas is usually discharged after going through a desulfurization process. Therefore, the sulfur dioxide concentration of such a flue gas is 100 ppm or lower. However, the test was conducted as an accelerated test, in which air containing a high concentration of sulfur dioxide of approximately 2000 ppm was used.

TABLE 5

(Unit: g CO₂/100 g Adsorbent)

| | Adsorbent Before SO₂ Exposure | Adsorbent After SO₂ Exposure | Adsorbent After Reloading |
|---|---|---|---|
| Average CO₂ Adsorption Amount | 3.2 | 1.0 | 3.3 |

CO₂ adsorption test conditions: Temp. 20° C., CO₂ conc. 10%, Humidity 50% RH

FIG. 2 shows a schematic configuration of a carbon dioxide separation apparatus according to another embodiment of the present invention. Description is given below with reference to FIG. 2 on the assumption that the carbon dioxide separation apparatus according to the present embodiment is used for separating carbon dioxide from room air. However, the apparatus according to the present embodiment can also be used for separating carbon dioxide from a flue gas from a coal fired power plant or the like, the flue gas containing a higher concentration of carbon dioxide. The carbon dioxide separation apparatus according to the present embodiment includes two adsorbent-packed tanks 1A and 1B. The adsorbent-packed tanks are packed with carbon dioxide adsorbents 2A and 2B, respectively. An input line 5A of the adsorbent-packed tank 1A is provided with a valve 33A. The input line 5A is connected to an air supply line 35. Similarly, an input line 5B of the adsorbent-packed tank 1B is provided with a valve 33B. The input line 5B is connected to the air supply line 35. An output line 6A of the adsorbent-packed tank 1A is provided with a valve 34A. The output line 6A is connected to a return line 36. Similarly, an output line 6B of the adsorbent-packed tank 1B is provided with a valve 34B. The output line 6B is connected to the return line 36.

A steam line 37A is connected to a lower part of the adsorbent-packed tank 1A, and a steam line 37B is connected to a lower part of the adsorbent-packed tank 1B. The steam lines 37A and 37B are both branch lines of a steam line 37. A steam generator 41 configured to supply steam, which is a heated gas stream for use in desorbing carbon dioxide from the carbon dioxide adsorbents 2A and 2B, is connected to the steam line 37. The steam lines 37A and 37B are provided with valves 38A and 38B, respectively. A temperature sensor 42 is attached to the steam generator 41.

An exhaust line 39A is connected to an upper part of the adsorbent-packed tank 1A and an exhaust line 39B is connected to an upper part of the adsorbent-packed tank 1B. The exhaust lines 39A and 39B are provided with valves 40A and 40B, respectively. The exhaust lines 39A and 39B merge into a single exhaust line 39. The exhaust line 39 communicates with the outside air via a suction pump 43.

In the present embodiment, a branch line 44A branches off from the output line 6A, and a branch line 44B branches off from the output line 6B. The branch line 44A, which branches off from the output line 6A, is connected to an upper part of the adsorbent-packed tank 1B. The branch line 44B, which branches off from the output line 6B, is connected to an upper part of the adsorbent-packed tank 1A. The branch lines 44A and 44B are provided with valves 45A and 45B, respectively.

A drainage discharge line 46A is connected to a lower part of the adsorbent-packed tank 1A, and a drainage discharge line 46B is connected to a lower part of the adsorbent-packed tank 1B. Drainage that occurs due to steam condensation within the adsorbent-packed tanks 1A and 1B is returned to the steam generator 41 through the lines 46A and 46B. The drainage discharge lines 46A and 46B are provided with valves 47A and 47B, respectively.

The carbon dioxide separation apparatus according to the present embodiment is used in a manner described below. First, the valves 33A and 34A are opened and the other valves are closed. In this state, room air is supplied to the adsorbent-packed tank 1A through the air supply line 35 and the input line 5A. After the carbon dioxide of the air has been adsorbed by the carbon dioxide adsorbent 2A within the adsorbent-packed tank 1A, the air is returned into the room through the output line 6A and the return line 36.

Next, at the time of desorbing the carbon dioxide from the carbon dioxide adsorbent 2A to regenerate the carbon dioxide adsorbent 2A, the valves 33A, 34A, and 38A are closed to stop supplying the room air to the adsorbent-packed tank 1A, and the valve 40A is opened while the other valves are kept closed. Next, the suction pump 43 is operated to reduce the internal pressure of the adsorbent-packed tank 1A. Thereafter, the valve 38A is opened, and saturated steam of 40 to 100° C. is supplied from the steam generator 41 to the adsorbent-packed tank 1A through the steam lines 37 and 37A. In the present embodiment, the saturated steam is used as a heated gas stream for carbon dioxide desorption. At the time of using the saturated steam for carbon dioxide desorption, first, the saturated steam starts to be supplied to the carbon dioxide adsorbent 2A. Accordingly, the saturated steam is condensed at the bottom portion of the carbon dioxide adsorbent 2A, causing a temperature increase. As a result, carbon dioxide adsorbed to the temperature-increased portion is desorbed. When the supply of the saturated steam is continued, the saturated steam is condensed at a low-temperature portion above the bottom portion of the carbon dioxide adsorbent 2A. Then, carbon dioxide is desorbed from the portion where the saturated steam is condensed. In this manner, in the carbon dioxide adsorbent 2A, a position at which the saturated steam is condensed gradually moves upward, and carbon dioxide is desorbed, accordingly. The desorbed carbon dioxide gradually moves upward within the carbon dioxide adsorbent 2A, and is then discharged to the exhaust line 39A. During such carbon dioxide desorption, the carbon dioxide concentration of a gas that is discharged to the exhaust line 39A is substantially 100%. Eventually, when the temperature of the entire carbon dioxide adsorbent 2A is increased, the carbon dioxide discharge amount is rapidly reduced to substantially 0%. The carbon dioxide that is discharged to the exhaust line 39A is discharged to the outside air through the exhaust line 39.

After the carbon dioxide adsorbent 2A is regenerated through the carbon dioxide desorption, the valves 33A, 45A, and 34B are opened and the other valves are closed. Next, the room air is supplied from the adsorbent-packed tank 1A to the adsorbent-packed tank 1B through the air supply line 35, the input line 5A, and the branch line 44A. The room air supplied in this case is used as a gas stream for use in cooling down the carbon dioxide adsorbent 2A. In this case, the room air is discharged from the adsorbent-packed tank 1A together with high-temperature steam and the amine compound that has evaporated, and flows into the adsorbent-packed tank 1B. In the adsorbent-packed tank 1B, the steam and the amine are captured by the carbon dioxide adsorbent 2B. The air is returned into the room through the output line 6B and the return line 36. Thus, in the present embodiment, the adsorbent-packed tank 1B also acts as an amine collector. Further, in the present embodiment, collection and reloading of the amine compound are performed in the adsorbent-packed tank 1B.

When the internal temperature of the adsorbent-packed tank 1B is reduced to a substantially ordinary temperature as a result of the supply of the room air to the adsorbent-packed tank 1B, carbon dioxide separation is started again in the adsorbent-packed tank 1A. At the time, as described above, the room air is supplied to the adsorbent-packed tank 1A with the valves 33A and 34A opened and the other valves closed.

As described above, since the adsorbent-packed tank 1A and the adsorbent-packed tank 1B have the same configuration, the above-described operations of carbon dioxide adsorption, desorption, and amine compound collection can be performed also with the adsorbent-packed tank 1B. It is also possible to operate the adsorbent-packed tank 1A and the adsorbent-packed tank 1B alternately.

It should be noted that in the case of using steam as a heated gas stream for carbon dioxide desorption, amine-containing steam drainage is accumulated at lower parts of the adsorbent-packed tanks 1A and 1B. The steam drainage can be collected into the steam generator 41 by regularly opening the valves 47A and 47B. At the time, the amine compound is also collected into the steam generator 41 together with the steam drainage. The collected amine compound is supplied to the adsorbent-packed tank 1A or 1B together with steam at the time of performing carbon dioxide adsorbent regeneration. As a result, the amine compound is reloaded onto the carbon dioxide adsorbent 2A or 2B.

Figure 3:
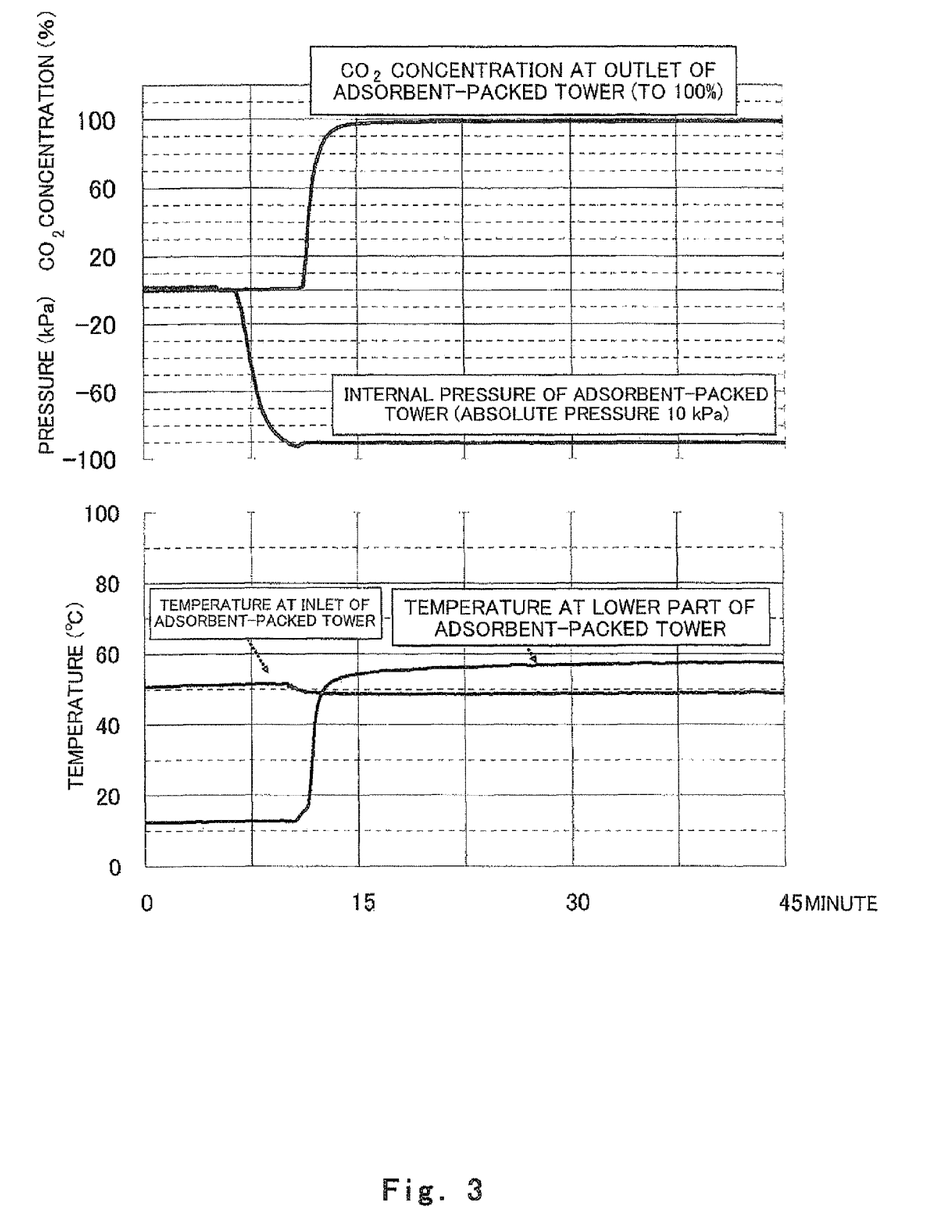
FIG. 3 shows carbon dioxide desorption test results obtained in a case where steam was used as a heated gas stream in the apparatus according to the embodiment shown in FIG. 2.

FIG. 3 shows carbon dioxide desorption test results in a case where the apparatus according to the embodiment shown in FIG. 2 was used. In this test, the internal pressure of the adsorbent-packed tank 1A was reduced to approximately 10 kPa (absolute pressure), and then saturated steam of approximately 50° C. was supplied. An upper chart in FIG. 3 shows the temperature at the outlet of the adsorbent-packed tank 1A of FIG. 2 and the internal pressure of the adsorbent-packed tank 1A. A lower chart in FIG. 3 shows the temperature of the supplied steam and the temperature at a lower part of the adsorbent-packed tank 1A. In FIG. 3, the horizontal axes of the upper and lower charts both represent elapsed time. It is clear from FIG. 3 that when the temperature of the adsorbent-packed tank 1A is increased, carbon dioxide of which the concentration is almost 100% is collected from the outlet of the adsorbent-packed tank 1A. The test results show that even if low-temperature steam is used, carbon dioxide can be desorbed and a high concentration of carbon dioxide can be collected. This indicates that the carbon dioxide adsorbent can be regenerated even with steam of a low temperature of 45 to 50° C. since the condensation energy of steam is substantially constant regardless of its temperature. Moreover, by using low-temperature steam, thermal degradation of the amine compound can be suppressed, which is advantageous. It should be noted that although the use of steam of a lower temperature is preferable from the standpoint of suppressing degradation of the amine compound, the temperature of the steam needs to be at least the temperature of the carbon dioxide adsorbent or higher since steam having a temperature lower than that of the carbon dioxide adsorbent does not cause condensation. Furthermore, a high-power suction pump is necessary in order to produce low-temperature steam. Thus, the use of such low-temperature steam is not favorable in terms of energy consumption.

FIG. 4 shows a schematic configuration of a carbon dioxide separation apparatus that uses a mixture gas of air and steam as a heated gas stream for carbon dioxide desorption. This apparatus has such a configuration that a steam generator 31 is added to the apparatus of FIG. 1. Other than the addition of the steam generator 31, the apparatus of FIG. 4 has the same configuration as the apparatus of FIG. 1. In FIG. 4, components corresponding to those in FIG. 1 are denoted by the same reference signs as those used in FIG. 1.

In the case of using the carbon dioxide separation apparatus shown in FIG. 4, the carbon dioxide adsorbing step, the amine reloading step, and the amine collecting step are performed in the same manner as described in the embodiment shown in FIG. 1. In this case, however, the amine desorbing step is different from the case previously described with reference to FIG. 1. Hereinafter, a description is given of the amine desorbing step that is performed in the case of using a mixture gas of air and steam as a heated gas stream.

In the amine desorbing step according to the present embodiment, steam from the steam generator 31 is forcibly mixed into a flow of heated air, and the mixture of the air and the steam is supplied to the carbon dioxide adsorbent 2. In this case, condensation of the steam in the heated gas stream gradually progresses from the upstream portion of the adsorbent 2 to the downstream portion of the adsorbent 2. The condensation heat causes the temperature of the adsorbent 2 to increase. As a result, carbon dioxide is desorbed from the adsorbent 2 and released to the outlet of the adsorbent-packed tank 1. Next, at a point when the carbon dioxide release has progressed to some extent and before the entire amount of adsorbed carbon dioxide is desorbed and released to the outlet, the supply of steam from the steam generator 31 is stopped and only the heated air continues to be supplied to the adsorbent. As a result, moisture condensed near the upstream end portion of the adsorbent re-evaporates, causing desorption of carbon dioxide remaining on the downstream portion of the adsorbent 2. At the same time, the condensed moisture of the carbon dioxide adsorbent 2 is removed from the adsorbent 2 through the evaporation. Accordingly, heat of evaporation is taken away from the carbon dioxide adsorbent 2 and thereby the carbon dioxide adsorbent 2 is cooled down to a temperature suitable for a next adsorption operation. In this manner, the desorbing step and the cooling step can be performed at the same time. It should be noted that in the carbon dioxide separation apparatus according to the present embodiment, a mixture gas of air and steam is used as a heated gas stream for carbon dioxide desorption. Therefore, a gas that is collected from the adsorbent-packed tank 1 is not 100% carbon dioxide unlike the above-described case of FIG. 3, but contains carbon dioxide at a concentration depending on the mixture ratio between air and steam used as the heated gas stream.

Table 6 shows effects that were obtained when mixture gases of air and steam were used as heated gas streams for carbon dioxide desorption in the carbon dioxide separation apparatus of FIG. 4. In Table 6, the mixture ratio of the steam to the heated air in each mixture gas is indicated as relative humidity of the heated air (in the leftmost column). Each heated gas stream was kept to 68° C. In Table 6, the "Theoretical Value of Air Amount Necessary for Desorption" indicates a value on the assumption that the amount of heat of the heated gas stream that is supplied to the carbon dioxide adsorbent when the temperature of the carbon dioxide adsorbent is 25° C. is entirely used for carbon dioxide desorption. The value indicates an air amount that is necessary per kilogram of desorbed carbon dioxide amount. "Actual Air Flow Measurement Value of Heated gas stream" indicates a value of an air amount that was actually used in the apparatus for carbon dioxide desorption. The value indicates an air amount that was used per kilogram of desorbed carbon dioxide amount. "Thermal Efficiency" indicates, based on the theoretical value and the actual measurement value, a proportion of an amount of heat used for the carbon dioxide desorption to the entire amount of heat of the heated gas stream.

As is clear from Table 6, in a case where a mixture fluid of heated air and steam is used as a heated gas stream, the amount of heated air to be supplied can be greatly reduced as compared to a case where only heated air is used as a heated gas stream. Thus, as compared to a case where only heated air is used as a heated gas stream for carbon dioxide desorption as in the embodiment described with reference to FIG. 1, the air flow of high-temperature air discharged to the outside together with the desorbed carbon dioxide can be reduced. Accordingly, when performing the carbon dioxide desorption, heat loss can be reduced and a small air sending power will suffice. Moreover, as compared to a case where only steam is used as a heated gas stream for the carbon dioxide desorption as in the embodiment described with reference to FIG. 2, heat loss caused by dew condensation is reduced and the carbon dioxide adsorbent can be regenerated under an ordinary pressure. This provides an advantage, for example, that the suction pump 43 (FIG. 2) prepared for carbon dioxide is unnecessary. Furthermore, by adjusting the air-steam ratio, temperature adjustment in the carbon dioxide desorbing step becomes easy, which is another advantage.

TABLE 6

(Unit: $Nm_3/kg\ CO_2$, Temperature of Carbon Dioxide Adsorbent: 25° C.)

| Heated gas stream for $CO_2$ Desorption (68° C.) | Theoretical Value of Air Amount Necessary for Desorption | Actual Air Flow Measurement Value of Heated gas stream | Thermal Efficiency |
|---|---|---|---|
| Warm Air of Heated Outside Air (App. 5% Humidity) | 65 | 144 | 45% |

TABLE 6-continued (Unit: Nm₃/kg CO₂, Temperature of Carbon Dioxide Adsorbent: 25° C.)

| Heated gas stream for CO₂ Desorption (68° C.) | Theoretical Value of Air Amount Necessary for Desorption | Actual Air Flow Measurement Value of Heated gas stream | Thermal Efficiency |
|---|---|---|---|
| Humidity 10% Warm Air | 51 | — | — |
| Humidity 20% Warm Air | 35 | — | — |
| Humidity 30% Warm Air | 26 | — | — |
| Humidity 40% Warm Air | 21 | 30 | 70% |
| Humidity 50% Warm Air | 18 | — | — |
| Humidity 60% Warm Air | 15 | — | — |
| Humidity 70% Warm Air | 13 | 16 | 82% |
| Humidity 80% Warm Air | 12 | — | — |

The above-described configuration where a mixture fluid of heated air and steam is used as a heated gas stream when performing carbon dioxide desorption is applicable to the carbon dioxide separation apparatus of FIG. 2. In this case, it is necessary to provide a valve or the like for use in mixing air with the steam generated by the steam generator 41.

Further, the configuration where a mixture fluid of heated air and steam is used as a heated gas stream is applicable not only to carbon dioxide separation methods and apparatuses in which a porous material loaded with an amine compound is used as a carbon dioxide adsorbent, but also to carbon dioxide separation methods and apparatuses in which an amino group-containing polymer or an ion-exchange resin is used as a carbon dioxide adsorbent. The same advantageous effects as those described above can be obtained with such application.

Industrial Applicability

The carbon dioxide separation method and the carbon dioxide separation apparatus according to the present invention make it possible to stably remove a relatively low concentration of carbon dioxide for a long term. Accordingly, the present invention is applicable in the office building industry and the transportation industry. Moreover, since the present invention is capable of removing carbon dioxide from an exhaust gas that contains carbon dioxide at a high concentration, the present invention is highly useful in the field of treatment of flue gas emissions from a thermal power plant or the like.

| Reference Signs List | |
|---|---|
| 1, 1A, 1B | adsorbent-packed tank |
| 2, 2A, 2B | carbon dioxide adsorbent |
| 3A, 3B | valve |
| 4A, 4B | valve |
| 5, 5A, 5B | input line |
| 6, 6A, 6B | output line |
| 11 | amine collector |
| 14 | amine aqueous solution preparation device |
| 15 | air supply line |
| 16 | return line |
| 17 | solution feed pump |
| 20 | undiluted amine solution tank |
| 22 | sensor |
| 25 | air discharge line |
| 31 | steam generator |
| 35 | air supply line |
| 36 | return line |
| 37A, 37B | steam line |
| 38A, 38B | valve |
| 39A, 39B | exhaust line |
| 40A, 40B | valve |
| 41 | steam generator |
| 42 | temperature sensor |
| 43 | suction pump |
| 44A, 44B | branch line |
| 45A, 45B | valve |
| 46A, 46B | drainage discharge line |

The invention claimed is:

1. A carbon dioxide separation method using a first and a second carbon dioxide adsorbent which are porous materials loaded with an amine compound, the method comprising:
    adsorbing carbon dioxide by causing a gas, which is to be treated, to come into contact with the first carbon dioxide adsorbent;
    desorbing, from the first carbon dioxide adsorbent by using a heated gas stream, carbon dioxide that has been adsorbed to the first carbon dioxide adsorbent; and reloading the amine compound onto the porous material of the first carbon dioxide adsorbent;
    cooling, by using a gas stream, the first carbon dioxide adsorbent that has been heated by the heated gas stream in the desorbing step; and
    introducing the gas stream that has cooled the first carbon dioxide adsorbent to the second carbon dioxide adsorbent, and capturing, with the second carbon dioxide adsorbent, the amine compound contained in the gas stream.

2. The carbon dioxide separation method according to claim 1, further comprising collecting the amine compound that has been desorbed from the first carbon dioxide adsorbent, wherein
    the amine compound used in the amine reloading step includes the amine compound that has been collected in the amine collecting step.

3. The carbon dioxide separation method according to claim 2, wherein the amine collecting step comprises collecting the amine compound from the gas stream that has desorbed carbon dioxide from the first carbon dioxide adsorbent in the desorbing step.

4. The carbon dioxide separation method according to claim 1, wherein the amine compound is monoethanolamine, diethanolamine, or a mixture of monoethanolamine and diethanolamine.

5. The carbon dioxide separation method according to claim 1, wherein the heated gas stream is a mixture gas of air and steam.

6. A carbon dioxide separation apparatus using a first and a second carbon dioxide adsorbent which are porous materials loaded with an amine compound, the apparatus comprising:
    a first adsorbent-packed tank packed with the first carbon dioxide adsorbent;
    an air supplier configured to supply a gas to be treated, the gas containing carbon dioxide, to the first adsorbent-packed tank;
    a heated gas stream supplier configured to supply a heated gas stream for use in desorbing, from the first carbon dioxide adsorbent, carbon dioxide that has been adsorbed to the first carbon dioxide adsorbent; and an amine re-loading device configured to supply the amine compound to the porous material of the first carbon dioxide adsorbent;

a second adsorbent-packed tank packed with the second carbon dioxide adsorbent;

a cooling gas stream supplier configured to supply a cooling gas stream to the first carbon dioxide adsorbent from which carbon dioxide has been desorbed; and an amine collector configured to introduce the gas stream that has cooled the first carbon dioxide adsorbent to the second adsorbent-packed tank, and to capture, with the second carbon dioxide adsorbent in the second adsorbent-packed tank, the amine compound that is contained in the gas stream.

7. The carbon dioxide separation apparatus according to claim 6, further comprising:

an amine collector configured to collect the amine compound that has been desorbed from the first carbon dioxide adsorbent, wherein the amine compound used in the reloading by the amine re-loading device includes the amine compound that has been collected by the amine collector.

8. The carbon dioxide separation apparatus according to claim 7, wherein the amine collector collects the amine compound from the gas stream that has desorbed carbon dioxide from the first carbon dioxide adsorbent.

9. The carbon dioxide separation apparatus according to claim 6, wherein the amine compound is monoethanolamine, diethanolamine, or a mixture of monoethanolamine and diethanolamine.

10. The carbon dioxide separation apparatus according to claim 6, wherein the heated gas stream supplied from the heated gas stream supplier is a mixture gas of air and steam.

11. The carbon dioxide separation method according to claim 2, wherein the amine compound is monoethanolamine, diethanolamine, or a mixture of monoethanolamine and diethanolamine.

12. The carbon dioxide separation method according to claim 3, wherein the amine compound is monoethanolamine, diethanolamine, or a mixture of monoethanolamine and diethanolamine.

13. The carbon dioxide separation method according to claim 2, wherein the heated gas stream is a mixture gas of air and steam.

14. The carbon dioxide separation method according to claim 3, wherein the heated gas stream is a mixture gas of air and steam.

15. The carbon dioxide separation method according to claim 4, wherein the heated gas stream is a mixture gas of air and steam.

16. The carbon dioxide separation apparatus according to claim 7, wherein the amine compound is monoethanolamine, diethanolamine, or a mixture of monoethanolamine and diethanolamine.

17. The carbon dioxide separation apparatus according to claim 8, wherein the amine compound is monoethanolamine, diethanolamine, or a mixture of monoethanolamine and diethanolamine.

18. The carbon dioxide separation apparatus according to claim 7, wherein the heated gas stream supplied from the heated gas stream supplier is a mixture gas of air and steam.

19. The carbon dioxide separation apparatus according to claim 8, wherein the heated gas stream supplied from the heated gas stream supplier is a mixture gas of air and steam.

20. The carbon dioxide separation apparatus according to claim 9, wherein the heated gas stream supplied from the heated gas stream supplier is a mixture gas of air and steam.

* * * * *